United States Patent
Kishimoto et al.

(10) Patent No.: US 10,872,210 B2
(45) Date of Patent: Dec. 22, 2020

(54) READING APPARATUS

(71) Applicant: TOSHIBA TEC KABUSHIKI KAISHA, Tokyo (JP)

(72) Inventors: Seiya Kishimoto, Tokyo (JP); Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/274,023

(22) Filed: Feb. 12, 2019

(65) Prior Publication Data

US 2019/0251308 A1 Aug. 15, 2019

(30) Foreign Application Priority Data

Feb. 15, 2018 (JP) .................. 2018-025092

(51) Int. Cl.
| | |
|---|---|
| *G06K 7/10* | (2006.01) |
| *G06Q 30/06* | (2012.01) |
| *H01Q 15/14* | (2006.01) |
| *G06Q 20/20* | (2012.01) |
| *H01Q 1/22* | (2006.01) |

(52) U.S. Cl.
CPC ..... *G06K 7/10346* (2013.01); *G06K 7/10376* (2013.01); *G06Q 20/20* (2013.01); *G06Q 30/06* (2013.01); *H01Q 1/2216* (2013.01); *H01Q 15/14* (2013.01)

(58) Field of Classification Search
CPC ........... G06K 7/10346; G06K 7/10376; G06Q 20/20; G06Q 30/06
USPC ................................. 235/383, 451
See application file for complete search history.

(56) References Cited

U.S. PATENT DOCUMENTS

| | | | | |
|---|---|---|---|---|
| 9,519,897 | B2* | 12/2016 | Terahara | G06Q 20/208 |
| 2005/0077353 | A1* | 4/2005 | Oishi | G06K 7/0008 |
| | | | | 235/385 |
| 2006/0097047 | A1* | 5/2006 | Oishi | G06K 7/0008 |
| | | | | 235/385 |
| 2007/0164107 | A1* | 7/2007 | Oishi | G06K 7/0008 |
| | | | | 235/385 |

(Continued)

FOREIGN PATENT DOCUMENTS

| | | |
|---|---|---|
| EP | 2741231 A1 | 6/2014 |
| JP | 2006048599 A | 2/2006 |
| JP | 2016-12211 A | 1/2016 |

OTHER PUBLICATIONS

Sheokand et al. "Transparent broadband metamaterial absorber based on resistive films", Journal of Applied Physics, American Institute of Physics, US, vol. 122, No. 10, Sep. 11, 2017, pp. 105105-1-7.

(Continued)

*Primary Examiner* — Paultep Savusdiphol
(74) *Attorney, Agent, or Firm* — Kim & Stewart LLP

(57) ABSTRACT

A reading apparatus is configured to communicate with a wireless tag attached to an object. The reading apparatus includes a container having a plurality of side walls and an opening such that the object can be placed through the opening, an antenna at a bottom of the container, configured to transmit and receive radio waves to and from the wireless tag, and a plurality of reflective elements arranged in the side walls so that the radio waves radiated from the antenna and reflected by the reflective elements do not leak through the opening to the outside.

20 Claims, 9 Drawing Sheets

(56) References Cited

U.S. PATENT DOCUMENTS

| | | | |
|---|---|---|---|
| 2008/0157967 A1* | 7/2008 | Jones | G01G 15/00 340/572.1 |
| 2014/0158772 A1* | 6/2014 | Bouveresse | G06K 7/10415 235/486 |
| 2015/0302228 A1* | 10/2015 | Hirono | G07G 1/0045 235/439 |
| 2015/0302379 A1* | 10/2015 | Terahara | G06Q 20/208 235/375 |
| 2018/0269572 A1 | 9/2018 | Oishi | |

OTHER PUBLICATIONS

Extended European Search Report dated Jun. 6, 2019 in corresponding European Patent Application No. 19154712.4, 7 pages.

* cited by examiner

READING APPARATUS

CROSS-REFERENCE TO RELATED APPLICATION

This application is based upon and claims the benefit of priority from Japanese Patent Application No. 2018-025092, filed on Feb. 15, 2018, the entire contents of which are incorporated herein by reference.

FIELD

Embodiments described herein relate generally to a reading apparatus.

BACKGROUND

A reading apparatus installed in a grocery store has a storage container for storing a commodity and an antenna for reading a wireless tag attached to the commodity. Such a reading apparatus reads the wireless tag when the commodity is placed in the storage container.

There is a case in which radio waves emitted from the antenna may leak out to the outside of the storage container in a conventional reading apparatus. As a result, the reading apparatus may read another wireless tag outside the storage container.

DETAILED DESCRIPTION

In accordance with an embodiment, a reading apparatus is configured to communicate with a wireless tag attached to an object. The reading apparatus includes a container having a plurality of side walls and an opening such that the object can be placed through the opening, an antenna at a bottom of the container, configured to transmit and receive radio waves to and from the wireless tag, and a plurality of reflective elements arranged in the side walls so that the radio waves radiated from the antenna and reflected by the reflective elements do not leak through the opening to the outside.

Hereinafter, an embodiment is described with reference to the accompanying drawings.

First Embodiment

First, a first embodiment is described.

A reading system according to the first embodiment reads a wireless tag. For example, the reading system is installed in a retail store for selling a commodity. The reading system reads information from the wireless tag attached to the commodity.

The reading system reads information from the wireless tag by a radio communication system such as an RFID (radio frequency identifier). Specifically, the reading system acquires an identifier or the like for specifying each wireless tag by transmitting a read command to the wireless tag.

Figure 1:
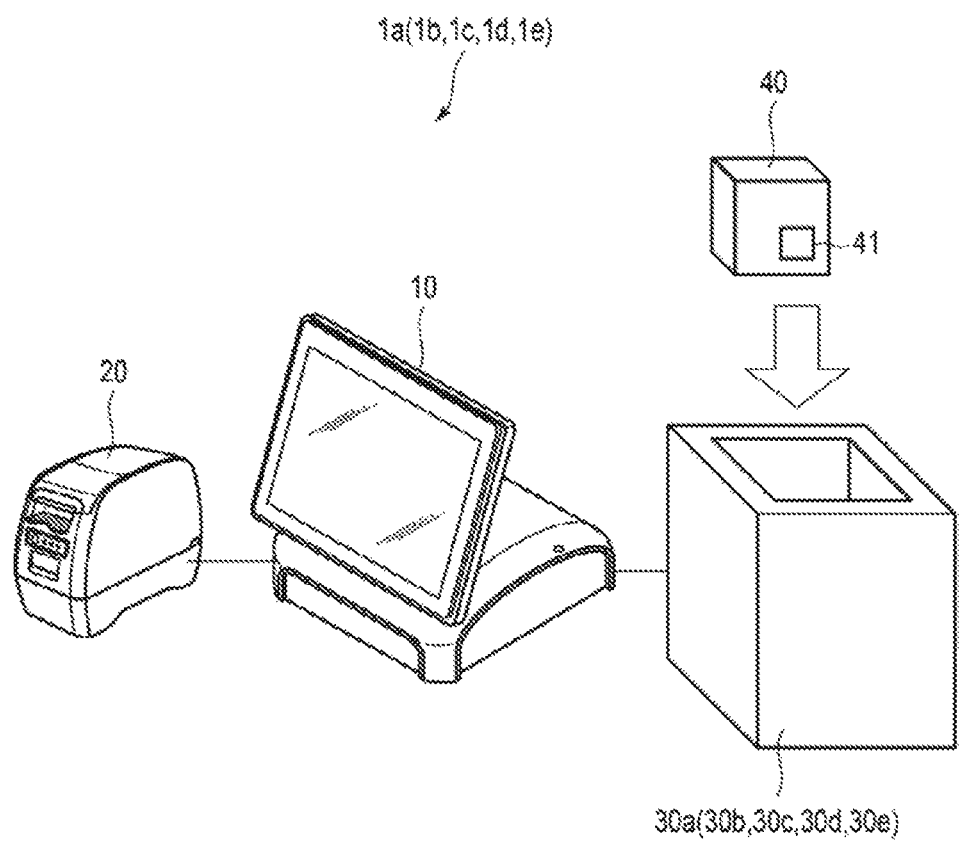
FIG. 1 is a diagram illustrating a reading system according to a first embodiment.

FIG. 1 is a diagram illustrating an example of a configuration of a reading system 1a. As shown in FIG. 1, the reading system 1a comprises a POS (point of sale) terminal 10, a printer 20 and a reading apparatus 30a. The POS terminal 10 and the printer 20 are electrically connected with each other. The POS terminal 10 and the reading apparatus 30a are electrically connected with each other. The reading system 1a may further have a component as required in addition to those shown in FIG. 1, or may exclude a specific component from the reading system 1a.

Here, the reading system 1a reads an identifier from a wireless tag 41 of a commodity 40.

The POS terminal 10 is used for settling the commodity 40.

For example, if an input of a predetermined operation is received from an operator, the POS terminal 10 reads the identifier from the wireless tag 41 using the reading apparatus 30a. The POS terminal 10 may continuously read the identifier from the wireless tag 41 using the reading apparatus 30a.

The POS terminal 10 specifies the commodity 40 based on the identifier read from the wireless tag 41 of the commodity 40. The POS terminal 10 acquires information such as a price of the commodity 40. The POS terminal 10 executes settlement processing on the commodity 40 based on the information such as the price. The POS terminal 10 executes the settlement processing on the commodity 40 using cash, points, a credit card or the like.

The printer 20 prints predetermined data based on a signal from the POS terminal 10. The printer 20 comprises a supply section for supplying a paper and a forming section for forming an image on the paper. For example, the supply section of the printer 20 supplies a thermal paper as the paper. The forming section of the printer prints an image on the thermal paper by heating the thermal paper.

For example, the printer 20 prints a receipt or credit details based on a signal from the POS terminal 10.

The commodity 40 is a commodity to be settled. The wireless tag 41 is attached to the commodity 40.

The wireless tag 41 wirelessly writes predetermined data from an external device or wirelessly transmits predetermined data to an external device.

The wireless tag 41 is activated (i.e., it becomes operable) by being supplied with electric power from an external device in a non-contact manner. The wireless tag 41 receives radio waves from the external device via an antenna as a communication interface, a modulation/demodulation circuit, and the like. A power supply section driven by the radio waves may generate an operation power supply and an operation clock to activate the wireless tag 41.

If the wireless tag 41 is activated, the wireless tag 41 can establish data communication with an external device through an antenna. For example, the wireless tag 41 receives an access password and the like from a reader through the antenna to establish communication with the reader. The wireless tag 41 transmits and receives predetermined data to and from the reader through the antenna.

The wireless tag 41 stores an identifier for identifying itself in advance. The wireless tag 41 transmits the identifier to the reader in response to a command from the reader.

For example, the wireless tag 41 is an RFID tag or the like. The configuration of the wireless tag 41 is not limited to a specific configuration.

The reading apparatus 30a is an interface for reading the identifier from the wireless tag 41 of the commodity 40. The reading apparatus 30a acquires an identifier from the wireless tag 41 of the commodity 40 put in the reading apparatus 30a. The reading apparatus 30a transmits the acquired identifier to the POS terminal 10.

For example, the reading apparatus 30a is formed on a table on which the POS terminal 10 is installed. Specifically, the reading apparatus 30a is installed on the table and has an opening through which the commodity 40 is put in. The installation position of the reading apparatus 30a is not limited to a specific position.

The reading apparatus 30a may read a wireless tag of one commodity or may read the wireless tags of a plurality of commodities at a time.

Figure 2:
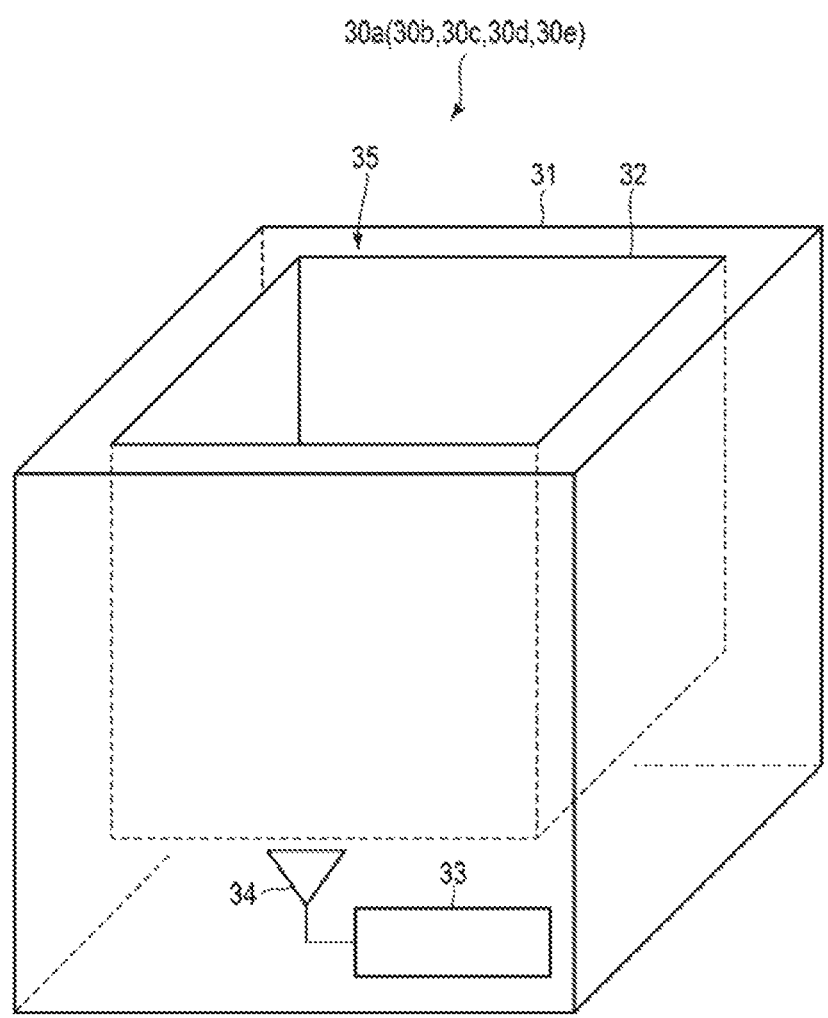
FIG. 2 is a diagram illustrating a configuration of a reading apparatus according to the first embodiment.

FIG. 2 is a diagram illustrating an example of a configuration of the reading apparatus 30a. As shown in FIG. 2, the reading apparatus 30a has an opening on the upper side. The reading apparatus 30a has a dual structure.

The reading apparatus 30a includes an outer layer 31, an inner layer 32, a reader 33, an antenna 34, and the like. The reader 33 and the antenna 34 are electrically connected to each other.

The outer layer 31 is a frame forming an outer shape of the reading apparatus 30a. The outer layer 31 is formed into a cubic shape. The outer layer 31 has an opening 35 having a predetermined size on the upper side. Here, the opening 35 is formed into a rectangular shape. For example, the outer layer 31 is made of a conductor such as metal.

The inner layer 32 is formed at the inside of the outer layer 31. The inner layer 32 is separated from a wall surface of the outer layer 31 by a predetermined width. The inner layer 32 is formed into a cubic shape. Specifically, the inner layer 32 is formed as a cube smaller than the outer layer 31. The opening 35 is surrounded by the inner layer 32. For example, the inner layer 32 is made of a material that at least partly transmits the radio waves. For example, the inner layer 32 is made of plastic or the like.

The inner layer 32 is formed so that an operator can put in or take out the commodity 40. For example, the size of the inner layer 32 is larger than that of the commodity 40.

For example, the inner layer 32 has a structure in which a shopping bag or the like can be placed in an open state. The operator puts the commodity 40 in the shopping bag and put the commodity in the inner layer 32 at the same time.

The reader 33 is electrically connected to the antenna 34, and the antenna 34 is formed between the outer layer 31 and the inner layer 32. Here, the reader 33 and the antenna 34 are formed on a bottom surface of the outer layer 31. The reader 33 may be installed at the outside of the outer layer 31.

The reader 33 can wirelessly communicate with the wireless tag 41 via the antenna 34. The reader 33 reads the identifier of the wireless tag 41 by performing data communication with the wireless tag 41. For example, the reader 33 transmits a predetermined read command to the wireless tag 41. The reader 33 receives the identifier as a response to the read command. The reader 33 transmits the received identifier to the POS terminal 10.

The antenna 34 is an antenna through which the reader 33 wirelessly communicates with the wireless tag 41. The antenna 34 radiates radio waves to the inside of the inner layer 32. For example, the antenna 34 may be a directional antenna having an upward directivity.

For example, the antenna 34 radiates circularly polarized waves, such as a patch antenna or a sequential array antenna. The configuration of the antenna 34 is not limited to a specific configuration.

The antenna 34 may include a plurality of antennas. The antenna 34 may be installed on the side surface of the inner side of the outer layer 31.

Next, the outer layer 31 is described.

Figure 3:
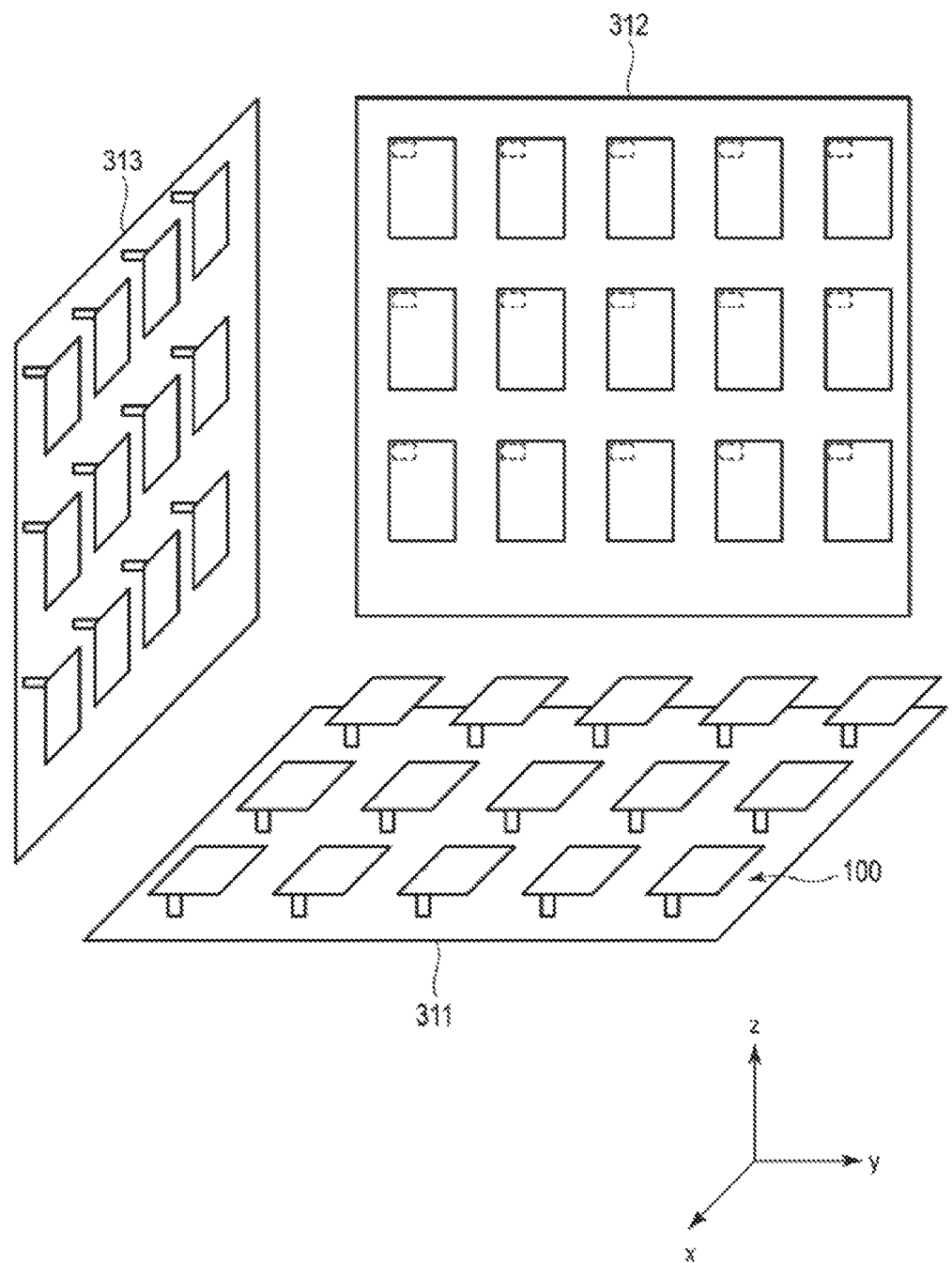
FIG. 3 is a diagram illustrating a configuration of an outer layer according to the first embodiment.

FIG. 3 is a diagram illustrating the outer layer 31. In FIG. 3, a front and rear direction in FIG. 3 is set as an x-axis direction, a left and right direction is set as a y-axis direction, and a vertical direction is set as a z-axis direction.

The outer layer 31 includes two wall surfaces facing each other in the x-axis direction, two wall surfaces facing each other in the y-axis direction and one wall surface (i.e., bottom surface) in the z-axis direction. Here, wall surfaces 311 to 313 are described as representatives.

The wall surface 311 is a wall surface (i.e., bottom surface) in the z-axis direction. The antenna 34 is formed on the wall surface 311.

The wall surface 312 is a wall surface in the x-axis direction. The wall surface 313 is a wall surface in the y-axis direction.

A reflection member 100 is formed at the inner side of the outer layer 31. Specifically, on the wall surfaces 311 to 313, the reflection member 100 is formed at the inner side. A plurality of the reflection members 100 is formed on the wall surfaces 311 to 313, respectively.

Here, the numbers of the reflection members 100 respectively formed on the wall surfaces 311 to 313 are the same. The numbers of the reflection members 100 respectively formed on the wall surfaces 311 to 313 may be different.

Figure 4:
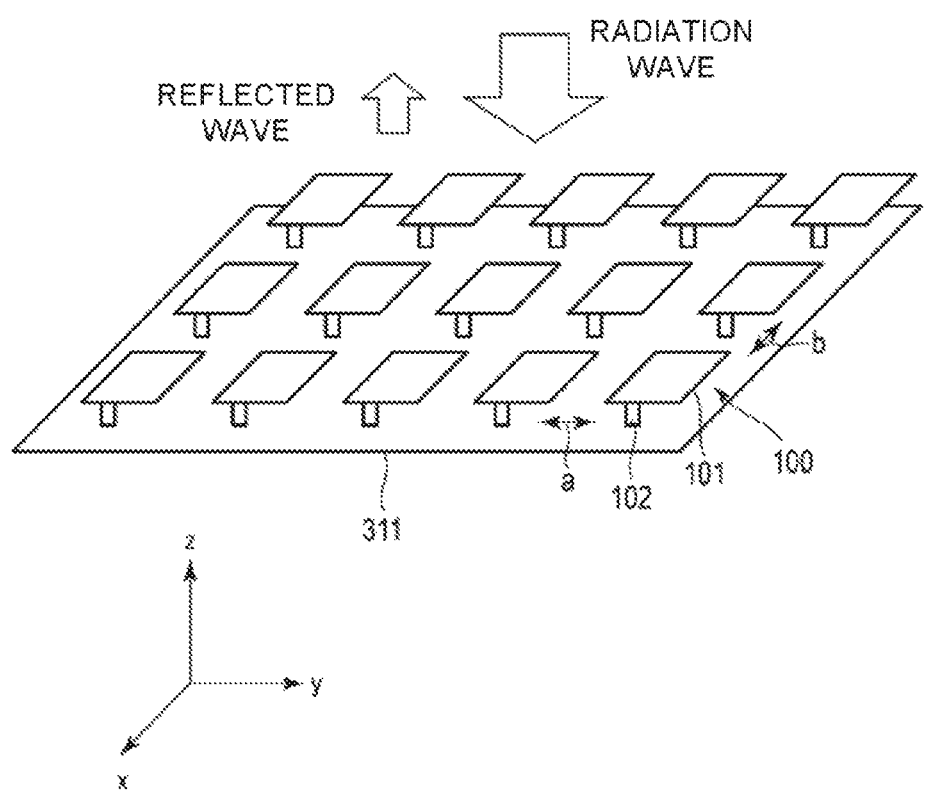
FIG. 4 is a diagram illustrating a configuration of a reflection member according to the first embodiment.

Next, the reflection member 100 is described. FIG. 4 is a diagram illustrating the reflection member 100. Here, the reflection member 100 formed on the wall surface 311 is described as a representative.

As shown in FIG. 4, the reflection members 100 are arranged in a grid shape on the wall surface 311. The reflection member 100 is formed at a predetermined interval from the adjacent reflection member 100. In the example shown in FIG. 4, the reflection members 100 are separated from each other by a distance b in the x-axis direction and a distance a in the y-axis direction.

In a case where the distances a and b between the reflection members 100 are a half of the wavelength of the radio waves radiated from the antenna 34, the radio waves vertically reaching the surfaces of the reflection members 100 are strongly reflected toward the front direction. In a case where the distances are equal to the wavelength, the radio waves are reflected toward not only the front direction but the side directions. Thus, in an embodiment, a plurality of reflection members 100 facing the opening of the reading apparatus 30a are arranged with the distances a and b equal to the wavelength, and the other reflection members 100 on the side surfaces of the reading apparatus 30a are arranged with the distances a an b equal to a half of the wavelength, thereby the radio waves are unlikely to travel toward the opening of the reading apparatus 30a.

For example, the distance a and the distance b are equal to or less than a quarter of a wavelength of the radio wave radiated from the antenna 34.

The plurality of the reflection members 100 may have different intervals and shapes depending on positions thereof.

The reflection member 100 includes a reflection element 101, a support body 102, and the like.

The reflection element 101 reflects radio waves radiated from the antenna 34 at a predetermined reflectance. The reflection element 101 is formed into a rectangular shape having a predetermined size. Specifically, the reflection element 101 is formed into a planar rectangular shape having a predetermined length in both the x-axis direction and the y-axis direction and a predetermined thickness. The reflection element 101 is made of a conductor such as metal.

The reflection element 101 may be formed into other planar shapes such as a circle or a polygon. The reflection element 101 may be a three-dimensional shape such as a cube. The structure of the reflection element 101 is not limited to a specific structure.

The support body 102 supports the reflection element 101. One end of the support body 102 is fixed to the wall surface 311 and the other end is fixed to the reflection element 101. The support body 102 is made of a conductor such as metal. Specifically, the support body 102 electrically connects the reflection element 101 with the wall surface 311.

The wall surface 311 on which a plurality of the reflection members 100 is formed reflects the radio waves radiated from the antenna 34 at a predetermined reflectance. Specifically, the interval and shape of each reflection element 101 is determined so as to achieve a desired reflectance.

The reflectance of the wall surface 311 may vary depending on the position on the wall surface 311.

Similarly, a plurality of the reflection members 100 is formed on the wall surfaces 312 and 313. Similarly, a plurality of the reflection members 100 is also formed on a wall surface facing the wall surface 312 and on a wall surface facing the wall surface 313.

Each wall surface may reflect the radiation waves at mutually different reflectance, or may reflect the radiation waves at the same reflectance. The number, shape and arrangement of the reflection member 100 formed on each wall surface are not limited.

The support body 102 may be an insulator. In other words, the reflection element 101 and the wall surface may be insulated from each other.

The reading apparatus configured as described above radiates an electromagnetic wave through the antenna to read the wireless tag attached to the put commodity. Since the position of the wireless tag is unknown, the reading apparatus supplies electric power to the antenna in such a manner that electromagnetic waves from the antenna cover the inner layer.

The electromagnetic waves from the antenna are reflected by the reflection element on the wall surface. Specifically, the electromagnetic waves from the antenna propagate through the space and reach the reflection element and the wall surface. If the electromagnetic waves reach the reflection element, an current is generated in the reflection element and the wall surface. A reflected wave is generated by the generated current.

By adjusting the configuration and arrangement of the reflection member, a distribution of the current flowing to the reflection element is controlled. By controlling the distribution of the current, a main propagation direction of the reflected wave is controlled so as to decrease the reflectance in a predetermined direction (e.g., upward direction).

As a result, the reading apparatus can prevent the reflected waves flowing out to the outside (i.e., reflected waves flowing out from the opening), thereby reducing leaked electromagnetic waves. Therefore, the reading apparatus can prevent a wireless tag located at the outside from being read.

By controlling the reflectance, the distribution of the reflected waves in the inner layer is controlled. As a result, the reading apparatus can prevent generation of an area where the wireless tag cannot be read in the inner layer.

The reading apparatus can achieve the above purpose without moving the antenna or the like.

Second Embodiment

Next, a second embodiment is described.

The reading apparatus according to the second embodiment is different from that of the first embodiment in that the reflection element 101 is connected to the wall surface via a switch. The same reference numerals are denoted to the same components, and the detailed description thereof is omitted.

As shown in FIG. 1, the reading system 1b according to the second embodiment comprises a reading apparatus 30b instead of the reading apparatus 30a. As shown in FIG. 2, the reading apparatus 30b includes the outer layer 31, the inner layer 32, the reader 33, the antenna 34, and the like.

Figure 5:
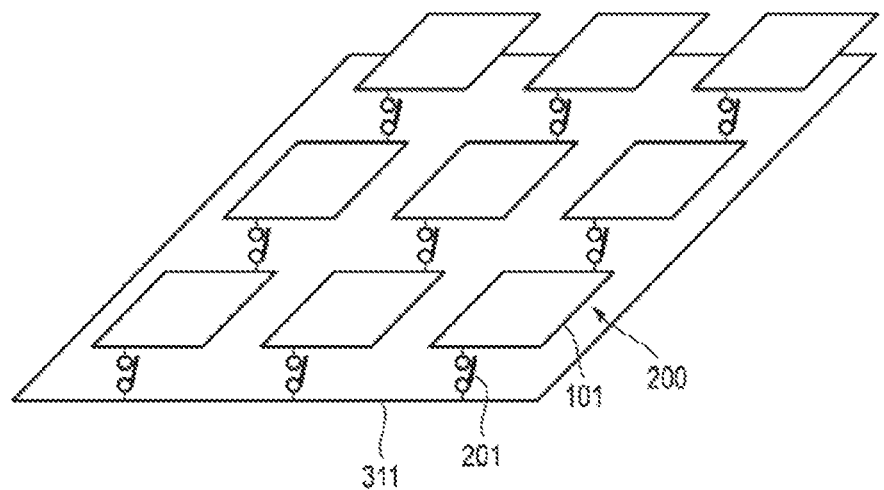
FIG. 5 is a diagram illustrating a configuration of a reflection member according to a second embodiment.

FIG. 5 shows an example of a configuration of a reflection member 200 of the reading apparatus 30b.

The reflection member 200 is formed on each wall surface of the outer layer 31. Here, the reflection member 200 formed on the wall surface 311 is described as a representative.

As shown in FIG. 5, the reflection member 200 includes the reflection element 101, a switch 201, and the like.

The reflection element 101 is as described above.

The switch 201 electrically connects the reflection element 101 with the wall surface 311. Specifically, one end of the switch 201 is connected to the wall surface 311 and the other end is connected to the reflection element 101. The switch 201 is turned on or off by an operator or the like. The switch 201 electrically connects the reflection element 101 with the wall surface 311 when it is turned on. When the switch 201 is turned off, the switch 201 electrically insulates the reflection element 101 from the wall surface 311.

The switch 201 may support the reflection element 101 on the wall surface 311. The reflection member 200 may include a support member that supports the reflection element 101 in a state in which the reflection element 101 is insulated from the wall surface 311.

As described above, the switch 201 is controlled by the operator. For example, at the time of installing the reading system 1b, the operator turns on or off each switch 201.

The operator turns on or off each switch 201 so that the wall surface 311 has a desired reflectance. The operator may turn on or off each switch 201 so that the reflectance of the wall surface 311 varies depending on the position on the wall surface 311.

In the reading apparatus configured as described above, each reflection element and the wall surface are connected to each other by the switch. Therefore, electrical connection states between respective reflection elements and the wall surface are different from each other.

As a result, a distribution of the current flowing through the reflection element by the radiation waves is controlled for each reflection element. Therefore, the reflectance of each wall surface is controlled more precisely.

Third Embodiment

Next, a third embodiment is described.

The reading apparatus according to the third embodiment is different from that of the first embodiment in that the reflection element 101 is connected to the wall surface via a variable capacitor. The same reference numerals are detonated to the same components, and the detailed description thereof is omitted.

As shown in FIG. 1, the reading system 1c according to the third embodiment comprises a reading apparatus 30c instead of the reading apparatus 30a. As shown in FIG. 2, the reading apparatus 30c includes the outer layer 31, the inner layer 32, the reader 33, the antenna 34, and the like.

Figure 6:
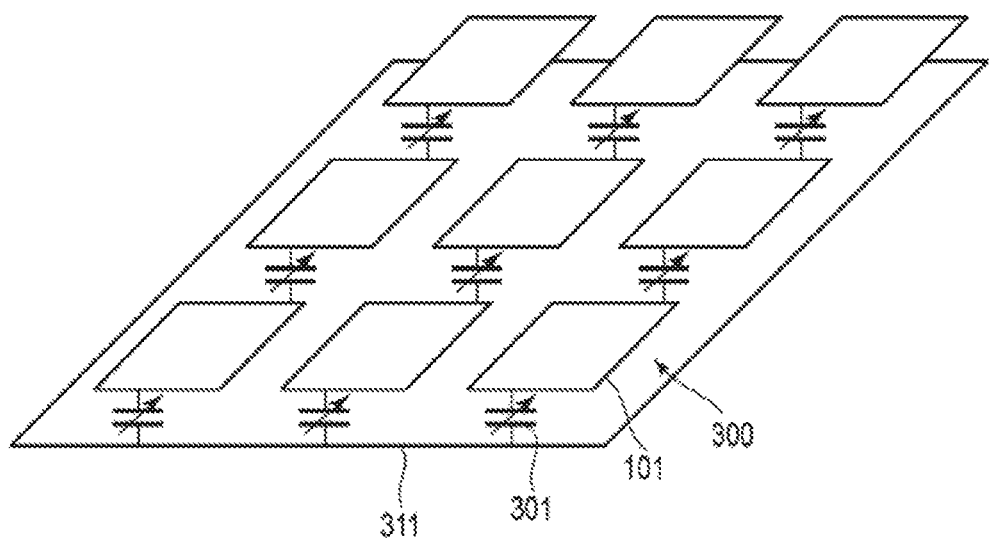
FIG. 6 is a diagram illustrating a configuration of a reflection member according to a third embodiment.

FIG. 6 shows an example of a configuration of a reflection member 300 of the reading apparatus 30c.

The reflection member 300 is formed on each wall surface of the outer layer 31. Here, the reflection member 300 formed on the wall surface 311 is described as a representative.

As shown in FIG. 6, the reflection member 300 includes the reflection element 101, a variable capacitor 301 and the like.

The reflection element 101 is as described above.

The variable capacitor 301 electrically connects the reflection element 101 with the wall surface 311. Specifically, one end of the variable capacitor 301 is connected to the wall surface 311 and the other end is connected to the reflection element 101. An electric capacitance of the variable capacitor 301 varies depending on the operation of an operator or the like.

The variable capacitor 301 may support the reflection element 101 on the wall surface 311. The reflection member 300 may include a support member that supports the reflection element 101 in a state in which the reflection element 101 is insulated from the wall surface 311.

As described above, the variable capacitor 301 is operated by the operator. For example, at the time of installing the reading system 1c, the operator adjusts the electric capacitance of each variable capacitor 301.

The operator adjusts the electric capacitance of each variable capacitor 301 so that the wall surface 311 has a predetermined reflectance. The operator may adjust the electric capacitance of each variable capacitor 301 so that the reflectance of the wall surface 311 varies depending on the position on the wall surface 311.

The reflection member 300 may include a fixed capacitor with a fixed electric capacity. The fixed capacitor electrically connects the reflection element 101 with the wall surface 311.

In the reading apparatus configured as described above, each reflection element and the wall surface are connected to each other by a variable capacitor. Therefore, by adjusting the electric capacitance of the variable capacitor, an amount of the current flowing from each reflection element to the wall surface is controlled.

As a result, the distribution of the current flowing to the reflection element by the radiation waves is controlled for each reflection element. Therefore, the reflectance of each wall surface is controlled more precisely.

Fourth Embodiment

Next, a fourth embodiment is described

The reading apparatus according to the fourth embodiment is different from that of the first embodiment in that the reflection elements 101 are connected to each other via a switch. The same reference numerals are denoted to the same components, and the detailed description thereof is omitted.

As shown in FIG. 1, the reading system 1d according to the fourth embodiment comprises a reading apparatus 30d instead of the reading apparatus 30a. As shown in FIG. 2, the reading apparatus 30d includes the outer layer 31, the inner layer 32, the reader 33, the antenna 34, and the like.

Figure 7:
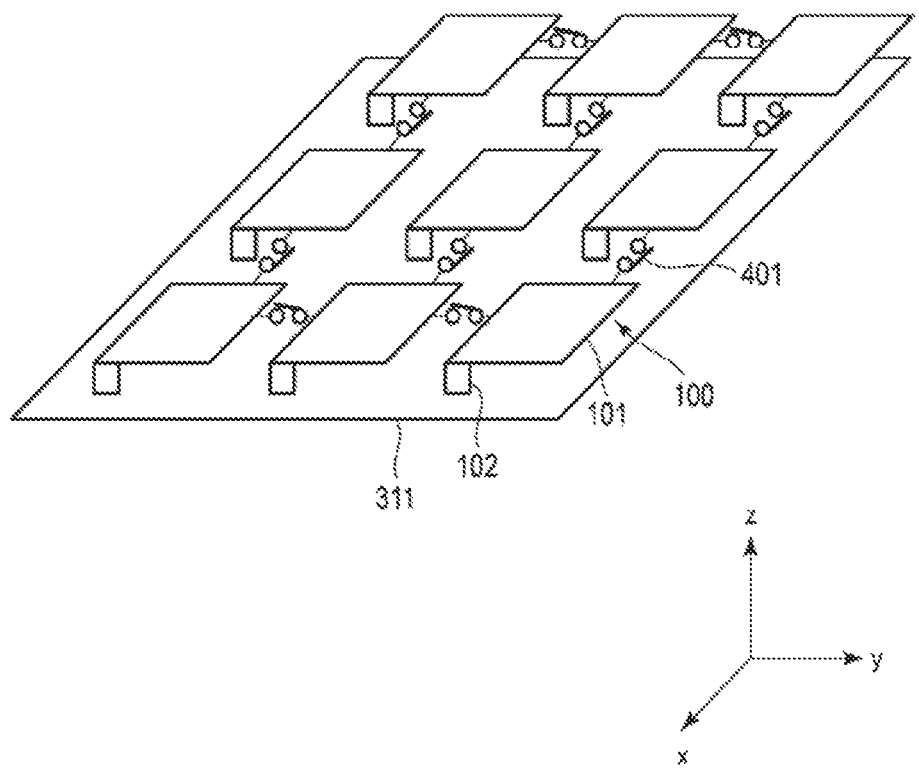
FIG. 7 is a diagram illustrating a configuration of a reflection member according to a fourth embodiment.

FIG. 7 shows an example of a connection relationship between the reflection members 100 of the reading apparatus 30d.

As shown in FIG. 7, a plurality of the reflection members 100 is formed on the wall surface 311.

A switch 401 is formed between the two reflection elements 101. Specifically, one end of the switch 401 is connected to a predetermined reflection element 101 and the other end is connected to another reflection element 101. The switch 401 is turned on or off by the operator or the like. When the switch 401 is turned on, the reflection elements 101 are electrically connected to each other. When the switch 401 is turned off, the reflection elements 101 are electrically insulated from each other.

In the example shown in FIG. 7, the reflection element 101 is connected to another reflection element 101 adjacent thereto in the x-axis direction via a predetermined switch 401. The reflection element 101 is connected to still another reflection element 101 adjacent thereto in the y-axis direction via a predetermined switch 401.

As described above, the switch 401 is operated by the operator. For example, at the time of installing the reading system 1d, the operator turns on or off each switch 401.

The operator turns on or off each switch 401 so that the wall surface 311 has a desired reflectance. The operator may turn on or off each switch 401 so that the reflectance of the wall surface 311 varies depending on the position on the wall surface 311.

The diagonally opposite reflection elements 101 may be connected to each other by the switch 401.

In the reading apparatus configured as described above, the reflection elements are connected to each other by the switch. Therefore, the current flowing to the predetermined reflection element flows to another reflection element.

As a result, by turning on or off the switch, the distribution of the current flowing through each reflection element is controlled by the radiation waves. Therefore, the reflectance and the reflection direction of each wall surface are controlled more precisely.

Fifth Embodiment

Next, a fifth embodiment is described.

The reading apparatus according to the fifth embodiment is different from that of the first embodiment in that the reflection elements 101 are connected to each other via a variable capacitor. The same reference numerals are denoted to the same components, and the detailed description thereof is omitted.

As shown in FIG. 1, the reading system 1e according to the fifth embodiment comprises a reading apparatus 30e instead of the reading apparatus 30a. As shown in FIG. 2, the reading apparatus 30e includes the outer layer 31, the inner layer 32, the reader 33, the antenna 34, and the like.

Figure 8:
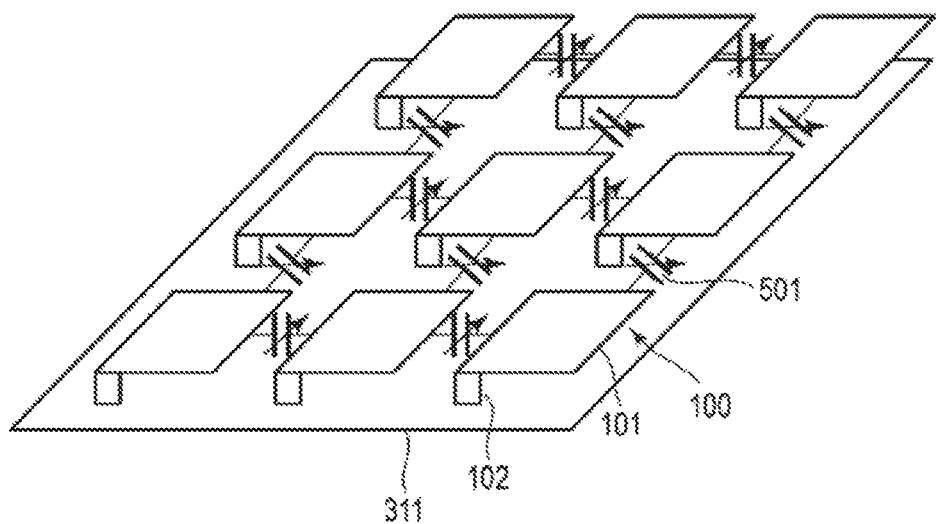
FIG. 8 is a diagram illustrating a configuration of a reflection member according to a fifth embodiment.

FIG. 8 shows an example of a connection relationship between the reflection members 100 of the reading apparatus 30e.

As shown in FIG. 8, a plurality of the reflection members 100 is formed on the wall surface 311.

A variable capacitor 501 is formed between the two reflection elements 101. Specifically, one end of the variable capacitor 501 is connected to a predetermined reflection element 101 and the other end is connected to another reflection element 101. The electric capacitance of the variable capacitor 501 can be changed by an operation by an operator or the like.

In the example shown in FIG. 8, the reflection element 101 is connected to another reflection element 101 adjacent thereto in the x-axis direction via a predetermined variable capacitor 501. The reflection element 101 is connected to still another reflection element 101 adjacent thereto in the y-axis direction via a variable capacitor 501.

As described above, the variable capacitor 501 is operated by the operator. For example, at the time of installing the reading system 1e, the operator adjusts the electric capacitance of each variable capacitor 501.

The operator adjusts the electric capacitance of each variable capacitor 501 so that the wall surface 311 has a predetermined reflectance. The operator may adjust the electric capacitance of each variable capacitor 501 so that the reflectance of the wall surface 311 varies depending on the position on the wall surface 311.

The reflection elements 101 may be connected to each other via a fixed capacitor with a fixed electric capacity. The fixed capacitor electrically connects the reflection elements 101.

Next, a modification is described.

In the modification, a reading apparatus 30e automatically adjusts the electric capacitance of the variable capacitor 501.

Figure 9:
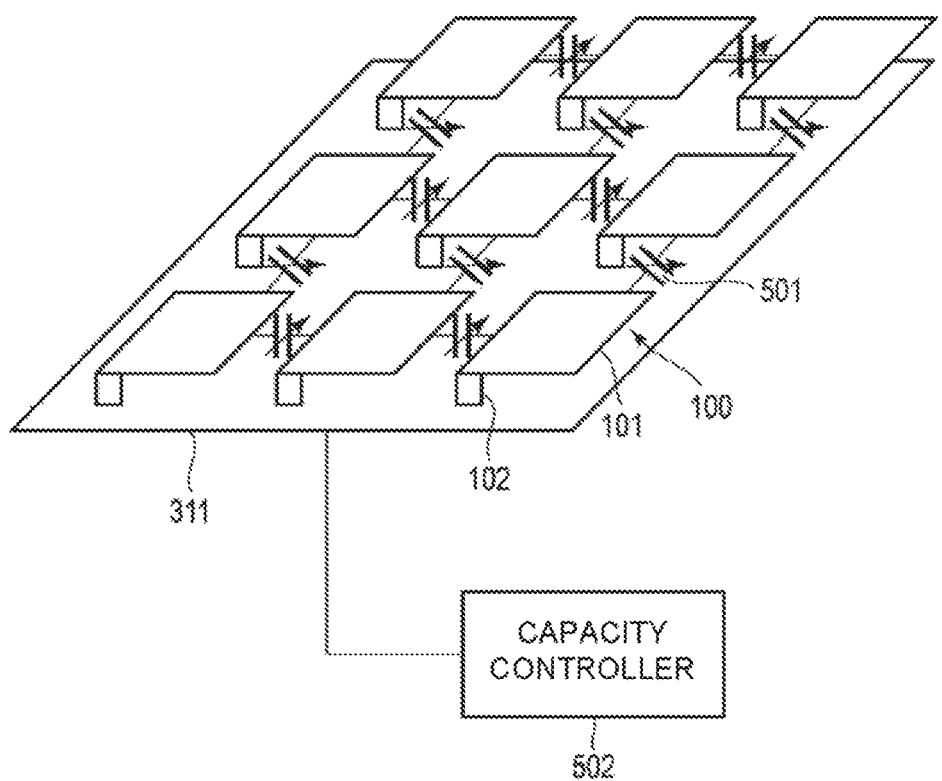
FIG. 9 is a diagram illustrating a configuration of a reading apparatus according to the fifth embodiment.

FIG. 9 is a diagram illustrating an example of a configuration of the reading apparatus 30e according to the modification. As shown in FIG. 9, the reading apparatus 30e further comprises a capacity controller 502.

The capacity controller 502 is connected to each variable capacitor 501. The capacity controller 502 adjusts the electric capacitance of each variable capacitor 501. For example, the capacity controller 502 adjusts the electric capacitance of each variable capacitor 501 at the time of installing the reading system 1e or the like.

For example, the capacity controller 502 is connected to a sensor that measures intensity of the reflected wave leaking out from the opening 35. The capacity controller 502 adjusts the electric capacitance of each variable capacitor 501 based on the intensity measured by the sensor. Specifically, the capacity controller 502 adjusts the electric capacitance of each variable capacitor 501 so that the intensity measured by the sensor becomes small.

The capacity controller 502 is, for example, an ASIC (Application Specific Integrated Circuit). Furthermore, the capacity controller 502 may be a processor that executes a program.

In the reading apparatus configured as described above, the reflection elements are connected with each other by a variable capacitor. Therefore, the current flowing through the predetermined reflection element flows to another reflection element. By adjusting the electric capacitance of the variable capacitor, it is possible to control the amount of the current flowing from the predetermined reflection element to another reflection element.

As a result, the distribution of the current by the radiation waves flowing to each reflection element is controlled. Therefore, the reflectance and the reflection direction of each wall surface are controlled more precisely.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A reading apparatus configured to communicate with a wireless tag attached to an object, the reading apparatus comprising:
   a container having a plurality of side walls and an opening such that the object can be placed through the opening, each of the side walls including an inner wall and an outer wall;
   an antenna at a bottom of the container, configured to transmit and receive radio waves to and from the wireless tag;
   a plurality of support members arranged on an inner surface of the outer wall of each side wall; and
   a plurality of reflective elements arranged on the support members and between the outer and inner walls of each side wall so that the radio waves radiated from the antenna and reflected by the reflective elements do not leak through the opening to the outside.

2. The reading apparatus according to claim 1, wherein each side wall is made of a conductor, and each reflective element is electrically connected to the side wall via a switch.

3. The reading apparatus according to claim 1, wherein each side wall is made of a conductor, and each reflective element is electrically connected to the side wall via a capacitor.

4. The reading apparatus according to claim 1, wherein the reflective elements are electrically connected to each other via a switch.

5. The reading apparatus according to claim 1, wherein the reflection elements are electrically connected to each other via a capacitor.

6. The reading apparatus according to claim 1, wherein the container has a bottom wall at the bottom of the container, and
   the bottom wall includes an inner wall and an outer wall.

7. The reading apparatus according to claim 6, further comprising:
   a plurality of first support members on an inner surface of the outer wall of the bottom wall, and
   a plurality of first reflective elements arranged on the first support members and between the outer and inner walls of surface of the bottom wall.

8. The reading apparatus according to claim 7, wherein the bottom wall is made of plastic.

9. The reading apparatus according to claim 1, wherein the antenna is a directional antenna having an upward directivity.

10. The reading apparatus according to claim 1, wherein each of the support members is an insulator.

11. A point of sale (POS) system comprising:
a POS terminal configured to register a commodity; and
a reading apparatus configured to read a wireless tag attached to the commodity, the reading apparatus comprising:
- a container having a plurality of side walls and an opening such that the object can be placed through the opening, each of the side walls including an inner wall and an outer wall;
- an antenna at a bottom of the container, configured to transmit and receive radio waves to and from the wireless tag;
- a plurality of support members arranged on an inner surface of the outer wall of each side wall; and
- a plurality of reflective elements arranged on the support members and between the outer and inner walls of each side wall so that the radio waves radiated from the antenna and reflected by the reflective elements do not leak through the opening to the outside.

12. The system according to claim 11, wherein
each side wall is made of a conductor, and each reflective element is electrically connected to the side wall via a switch.

13. The system according to claim 11, wherein
each side wall is made of a conductor, and each reflective element is electrically connected to the side wall via a capacitor.

14. The system according to claim 11, wherein
the reflective elements are electrically connected to each other via a switch.

15. The system according to claim 11, wherein
the reflection elements are electrically connected to each other via a capacitor.

16. The system according to claim 11, wherein
the container has a bottom wall at the bottom of the container, and
the bottom wall includes an inner wall and an outer wall.

17. The system according to claim 16, wherein the reading apparatus further comprises:
- a plurality of first support members on an inner surface of the outer wall of the bottom wall, and
- a plurality of first reflective elements arranged on the first support members and between the outer and inner walls of the bottom wall.

18. The system according to claim 17, wherein
the bottom wall is made of plastic.

19. The system according to claim 11, wherein
the antenna is a directional antenna having an upward directivity.

20. The system according to claim 11, wherein
each of the support members is an insulator.

* * * * *